United States Patent
Kodaira

(10) Patent No.: US 10,409,042 B2
(45) Date of Patent: Sep. 10, 2019

(54) WIDE ATTACHMENT, AND IMAGE PICKUP LENS AND IMAGE PICKUP APPARATUS INCLUDING SAME

(71) Applicant: CANON KABUSHIKI KAISHA, Tokyo (JP)

(72) Inventor: Masakazu Kodaira, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 102 days.

(21) Appl. No.: 15/638,419

(22) Filed: Jun. 30, 2017

(65) Prior Publication Data
US 2018/0011301 A1    Jan. 11, 2018

(30) Foreign Application Priority Data
Jul. 5, 2016 (JP) ................ 2016-133469

(51) Int. Cl.
*G02B 15/02* (2006.01)
*G02B 15/12* (2006.01)
*G02B 15/10* (2006.01)

(52) U.S. Cl.
CPC ............. *G02B 15/12* (2013.01); *G02B 15/10* (2013.01)

(58) Field of Classification Search
CPC ........ G02B 13/18; G02B 15/10; G02B 15/06; G02B 15/00; G02B 15/22
USPC ................ 359/672–706
See application file for complete search history.

(56) References Cited

U.S. PATENT DOCUMENTS

| 9,588,323 B2 | 3/2017 | Tatenuma et al. |
| 2011/0102541 A1* | 5/2011 | Jin ............ G02B 9/60 348/36 |
| 2016/0124199 A1 | 5/2016 | Sanjo et al. |

FOREIGN PATENT DOCUMENTS

| JP | H04350815 A | 12/1992 |
| JP | H11-305120 A | 11/1999 |
| JP | 2006084738 A | 3/2006 |
| JP | 4527363 B2 | 8/2010 |
| JP | 2016-18162 A | 2/2016 |

OTHER PUBLICATIONS

Japanese Office Action for application No. 2016133469 dated Feb. 19, 2019. with English translation.

* cited by examiner

*Primary Examiner* — Mahidere S Sahle
(74) *Attorney, Agent, or Firm* — Carter, DeLuca & Farrell LLP

(57) ABSTRACT

A wide attachment which is detachably attached to an object side of a lens apparatus and in which a focal length of the lens apparatus is shifted to a short focal length side. The wide attachment is formed of a single meniscus lens having a negative refractive power. The lens has an aspherical surface. The following conditional expressions are satisfied: $-5.2<-(r1+r2)/(r1-r2)<-1.3$, and $1.50<nd<1.53$, where r1 represents a curvature radius of a surface on an object side of the lens, r2 represents a curvature radius of a surface on an image side of the lens, and nd represents a refractive index of a material constituting the lens with respect to d-line, wherein a curvature radius of the aspherical surface is defined as a curvature radius of a spherical surface passing through a lens vertex and a maximum effective diameter of the aspherical surface.

5 Claims, 10 Drawing Sheets

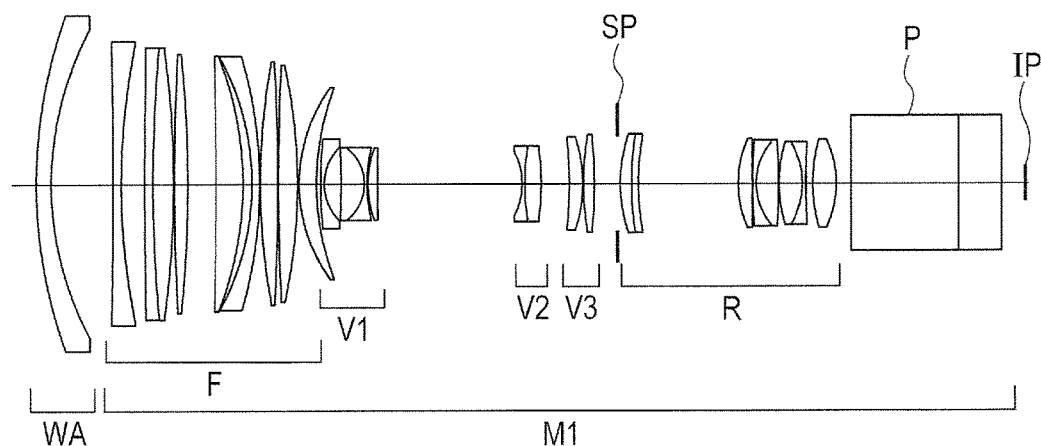
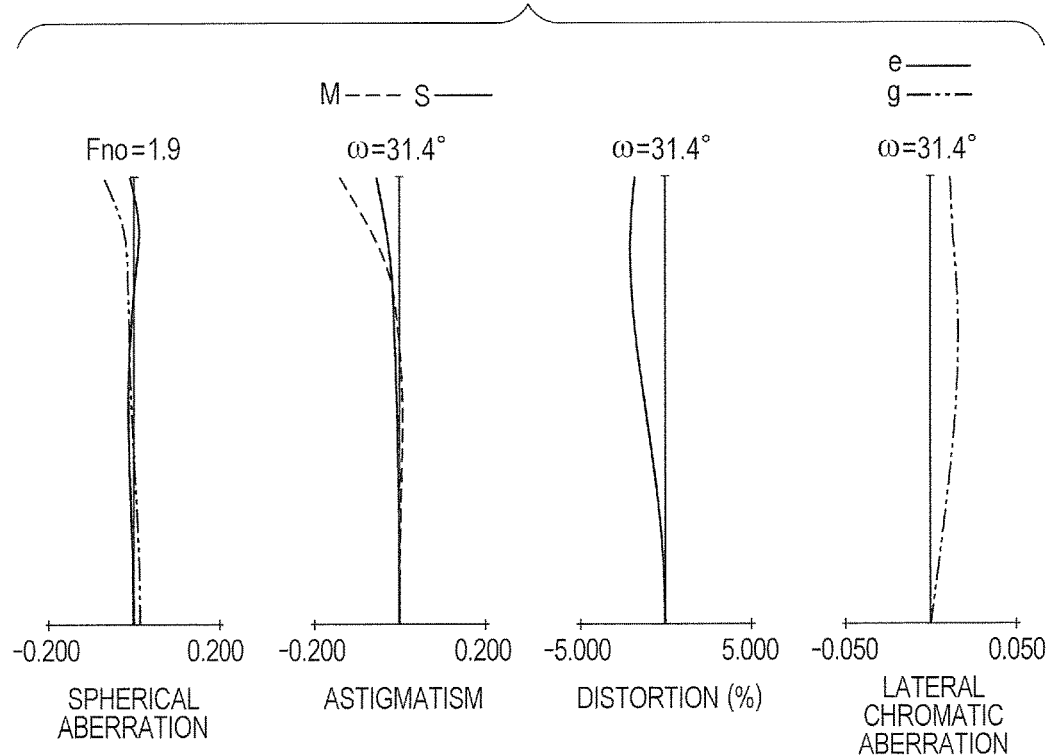

WIDE ATTACHMENT, AND IMAGE PICKUP LENS AND IMAGE PICKUP APPARATUS INCLUDING SAME

BACKGROUND OF THE INVENTION

Field of the Invention

The present invention relates to a wide attachment to be attached to an object side of an image pickup lens for a still camera or a video camera in order to obtain a widening effect, and to a lens apparatus including the same.

Description of the Related Art

To meet a demand for obtaining a widening effect during image pickup, a pickup method by attaching an optical accessory such as a converter and an attachment onto an object side of an image pickup lens at a wide-angle end is adopted as disclosed in Japanese Patent No. 4527363, for example.

In recent years, the diffusion of higher-definition broadcast systems surpassing the HDTV broadcast has been anticipated, and image pickup lenses have been facing a growing demand for higher optical performances. In these circumstances, optical accessories including wide attachments to be attached to and used with such lenses have been required to achieve ever higher performances. Meanwhile, there has also been a demand that such an optical accessory be further reduced in weight as well so as to ensure mobility of a camera operator. To meet these demands, the optical accessory needs to achieve sufficient aberration correction by itself while accomplishing reduction in size and weight.

There are previously known optical accessories each formed of a single negative spherical lens. While achieving light weight, these optical accessories only have an inadequate optical performance, particularly in correction of astigmatism or curvature of field. Meanwhile, there are other optical accessories each formed of two negative and positive spherical lenses in order to improve an optical performance, but have the drawback of being heavy in weight.

SUMMARY OF THE INVENTION

To solve the aforementioned problems, it is an object of the present invention to provide a wide attachment which achieves both a high optical performance and reduction in size and weight at the same time.

A wide attachment of the present invention is a wide attachment which is detachably attached to an object side of a lens apparatus and in which a focal length of the lens apparatus is shifted to a short focal length side, which includes a single meniscus lens having a negative refractive power. The lens has an aspherical surface. The following conditional expressions are satisfied $-5.2<-(r1+r2)/(r1-r2)<-1.3$, and $1.50<nd<1.53$, where r1 represents a curvature radius of a surface on an object side of the lens, r2 represents a curvature radius of a surface on an image side of the lens, and nd represents a refractive index of a material constituting the lens with respect to d-line, wherein a curvature radius of the aspherical surface is defined as a curvature radius of a spherical surface passing through a lens vertex and a maximum effective diameter of the aspherical surface.

The wide attachment of the present invention detachably provided on an object side of a master lens has the above-described characteristic configuration. As a consequence, the wide attachment can achieve an optical performance to sufficiently correct aberrations by itself though the wide attachment is small in size and light in weight.

Further features of the present invention will become apparent from the following description of exemplary embodiments with reference to the attached drawings.

BRIEF DESCRIPTION OF THE DRAWINGS

FIG. 1 is a lens sectional view of a master lens M1 (a zoom lens), which is equipped with a wide attachment of Embodiment 1, set to a wide-angle end, and focused on an object at an indefinite distance.

FIG. 2 shows aberration diagrams of the master lens M1 set to the wide-angle end and focused on an object at an indefinite distance.

DESCRIPTION OF THE EMBODIMENTS

Figure 3:
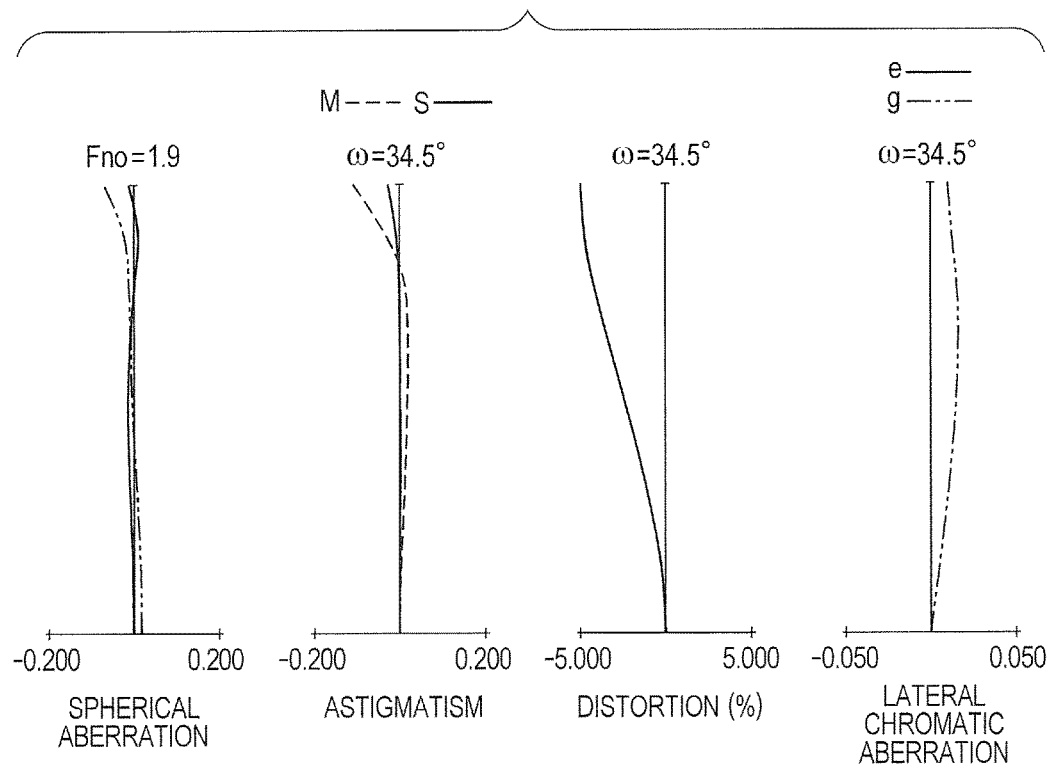
FIG. 3 shows aberration diagrams of the master lens M1, which is equipped with the wide attachment of Embodiment 1, set to the wide-angle end, and focused on an object at an indefinite distance.

An embodiment of the present invention will be described below in detail with reference to the accompanying drawings.

A wide attachment of the present invention is detachably provided on an object side of a master lens (a lens apparatus), and shifts a focal length of the lens apparatus to a short focal length side. The wide attachment is formed of a single meniscus lens having a negative refractive power and at least one aspherical surface. The lens constituting the wide attachment of the present invention is characterized in that the lens includes at least the one aspherical surface, and in the case of the aspherical surface, a curvature radius of a spherical surface passing through a lens vertex and a maximum effective diameter is defined as a curvature radius of the aspherical surface. Moreover, a curvature radius of a surface on an object side of the lens and a curvature radius of a surface on an image side thereof satisfy predetermined conditional expressions.

Here, a wide attachment WA is detachably provided on the object side of the master lens to shorten the focal length (widens an angle of view) of the master lens irrespective of a configuration of the master lens (a lens configuration thereof, and whether or not the master lens is a prime lens or a zoom lens).

The wide attachment WA is formed of a single meniscus lens having a negative refractive power. The lens has at least one aspherical surface. If the wide attachment WA is designed by using spherical surfaces only, each surface develops curvature of field and distortion whereby an optical performance at a peripheral part of an image plane is deteriorated. Accordingly, this embodiment suppresses the development of curvature of field and distortion and thus achieves a high optical performance by applying an aspherical surface having such a shape that its curvature radius gradually changes to bring about reduction in negative refractive power toward a peripheral part thereof.

Assuming that the curvature radius of the surface on the object side of the lens is r1 and the curvature radius of the surface on the image plane side of the lens is r2, the wide attachment of the present invention preferably satisfies the following conditional expression, provided that a curvature radius of a spherical surface passing through a lens vertex and a maximum effective diameter is defined as the curvature radius of the aspherical surface:

$$-5.2 < -(r1+r2)/(r1-r2) < -1.3 \quad (1).$$

If the infimum condition in the conditional expression (1) is not satisfied, the curvature of field becomes overcorrected, thereby deteriorating the optical performance. In addition, the failure to satisfy the infimum condition is not favorable because an off-axial principal ray cannot enter the surface on the object side of the negative lens and vignetting occurs as a consequence.

If the supremum condition in the conditional expression (1) is not satisfied, the lens increases its thickness in the optical axis direction, thereby increasing its size. In addition, the failure to satisfy the supremum condition is not preferable because fabrication of the lens is complicated.

It is more preferable that the conditional expression (1) satisfy a range defined by the following expression (1a):

$$-5.0 < -(r1+r2)/(r1-r2) < -1.5 \quad (1a).$$

Assuming that a focal length at a wide-angle end of the master lens is fmw and a focal length of the wide attachment is fa, the wide attachment of the present invention preferably satisfies the following conditional expression (2):

$$-0.300 < fmw/fa < -0.010 \quad (2).$$

The widening effect is lost if the infimum condition in the conditional expression (2) is not satisfied as a consequence of the focal length fa becoming larger than the focal length fmw.

Power of the wide attachment is increased if the supremum condition in the conditional expression (2) is not satisfied as a consequence of the focal length fa becoming smaller than the focal length fmw. As a consequence, correction of aberrations is complicated and the optical performance is deteriorated.

It is more preferable that the conditional expression (2) satisfy a range defined by the following expression (2a):

$$-0.250 < fmw/fa < -0.010 \quad (2a).$$

Assuming that aspherical surface amounts at forty-percent, seventy-percent, and ninety-percent of the lens effective radius of the aspherical surface are $\Delta 4$, $\Delta 7$, and $\Delta 9$, respectively, the wide attachment of the present invention preferably satisfies the following conditional expressions (3) and (4). Here, the aspherical surface amount is defined as a length in the optical axis direction between the aspherical surface and the spherical surface that passes through the lens vertex and the maximum effective diameter of the aspherical surface:

$$0.10 < |\Delta 4/\Delta 7| < 0.80 \quad (3); \text{ and}$$

$$0.20 < |\Delta 9/\Delta 7| < 1.60 \quad (4).$$

If the infimum conditions in the conditional expressions (3) and (4) are not satisfied because of small values $\Delta 4$ and $\Delta 9$, it is not possible to suppress development of the curvature of field and the distortion and the optical performance is deteriorated. On the other hand, if the supremum conditions in the conditional expressions (3) and (4) are not satisfied because of large values $\Delta 4$ and $\Delta 9$, the curvature of field is excessively corrected and the optical performance is deteriorated.

It is more preferable that the conditional expressions (3) and (4) satisfy ranges defined by the following expressions (3a) and (4a), respectively:

$$0.15 < |\Delta 4/\Delta 7| < 0.75 \quad (3a); \text{ and}$$

$$0.40 < |\Delta 9/\Delta 7| < 1.30 \quad (4a).$$

Assuming that a refractive index of a material constituting the lens with respect to the d-line is nd, the wide attachment of the present invention satisfies the following expression:

$$1.50 < nd < 1.53 \quad (5).$$

The wide attachment in each of the following embodiments is formed of a meniscus lens having a negative refractive power and an aspherical surface.

Embodiment 1

A description will be given of a wide attachment according to Embodiment 1 of the present invention and a zoom lens being a master lens M1 equipped with the wide attachment.

FIG. 1 is a lens sectional view of a zoom lens serving as a master lens M1 with a wide attachment WA of Embodiment 1 attached to an object side, in the state where the master lens M1 is set to a wide-angle end and focused on an object at an indefinite distance. FIG. 2 shows aberration diagrams of the master lens M1 set to the wide-angle end and focused on an object at an indefinite distance. FIG. 3 shows aberration diagrams of the master lens M1 with the wide attachment of this embodiment attached to the object side, in the state where the master lens M1 is set to the wide-angle end and focused on an object at an indefinite distance. Regarding the longitudinal aberration diagrams, a solid line and a dashed line in a diagram on spherical aberration indicate the e-line and the g-line, respectively. A dashed line and a solid line in a diagram on astigmatism indicate meridional image plane (m) and sagittal image plane (s), respectively. A dashed line in a diagram on lateral chromatic aberration indicates the g-line. Sign ω represents a half angle of view while sign Fno represents the F-number. The longitudinal aberration diagrams are drawn at scales of 0.2 mm for the spherical aberration, 0.2 mm for the astigmatism, 5% for distortion, and 0.05 mm for the lateral chromatic aberration, respectively.

The zoom lens serving as the master lens M1 equipped with the wide attachment of this embodiment includes a front lens unit F of a focus unit, a mobile unit V1, a mobile unit V2, a mobile unit V3, a stop SP, a relay lens unit R, and a unit P being either a color-separating prism or an optical filter, which are arranged in this order from the object side to the image side. The front lens unit F has a positive refractive power as a first lens unit, while mobile groups V1 and V2 are lens units each having a negative refractive power, which change a magnification from a wide-angle end to a telephoto end by traveling on the optical axis while changing an interval between the lens units. The mobile group V3 has a positive refractive power and is configured to travel non-linearly on the optical axis in order to correct an image plane variation attributed to the change in magnification. The mobile units V1, V2 and V3 collectively constitute a magnification change unit. The relay lens unit R has a positive refractive power as a fixed fifth lens unit. The unit P is any of a color-separating prism, an optical filter, and the like, which is illustrated as a glass block in FIG. 1. Sign IP in FIG. 1 denotes an image pickup surface to receive an optical image formed with an image pickup lens, which corresponds to an image pickup element in an electronic image pickup apparatus or a film surface in a silver-halide film camera. The master lens M1 is the zoom lens with a zoom ratio of 15.92 and a field of view of 62.86 degrees at the wide-angle end. This master lens M1 is the same as a master lens to be equipped with each of wide attachments of Embodiments 2 to 4, 7, and 8 to be described later. Accordingly, the explanation of the master lens M1 will be omitted in the description of Embodiments 2 to 4, 7, and 8.

The wide attachment WA of this embodiment is formed of a single meniscus lens having a negative refractive power, and a surface on the image side (2nd surface) of the lens is formed into an aspherical surface.

Numerical value data on the wide attachment WA of Embodiment 1 are shown below.

Numerical value embodiments of the wide attachment WA and the master lens M1 of this embodiment are shown below. In each numerical value embodiment, sign i indicates the order of the surface enumerated from the object side, sign ri indicates a curvature radius of an i-th surface from the object side, sign di indicates an interval between the i-th surface and the i+1-th surface from the object side, and signs ndi and υdi indicate a refractive index and the Abbe number of a medium located between the i-th surface and the i+1-th surface, respectively. Meanwhile, sign BF indicates air conversion back focus. The last three surfaces belong to the glass block such as the filter.

Here, assuming that refractive indices of the Fraunhofer F-line (486.1 nm), d-line (587.6 nm), and C-line (656.3 nm) are nF, nd, and nC, respectively, the d-line based Abbe number vd of a material of an optical element (a lens) is expressed as below:

$$\upsilon d=(nd-1)/(nF-nC) \qquad (6).$$

In each numerical value embodiment, a surface having a surface number with a suffix of an asterisk represents an aspherical surface. Assuming that an X axis represents a direction of an optical axis, an H axis is an axis extending in a perpendicular direction to the optical axis, a traveling direction of the light is positive, sign R is a paraxial curvature radius, sign k is a conic constant, and sign An is an n-th order aspheric coefficient, a shape of the aspherical surface is defined by the following expression (7):

$$X = \frac{H^2/R}{1+\sqrt{1-(1+k)(H/R)^2}} + A4H^4 + A6H^6 + A8H^8 + A10H^{10} + A12H^{12}. \qquad (7)$$

The paraxial curvature radius is defined as a length from a point (a surface vertex) where a reference axis penetrates a boundary surface to the curvature center C. Accordingly, the paraxial curvature radius is positive when the center C is located on the right side of the surface vertex, or negative when the center C is located on the left side of the surface vertex. In the meantime, an index "e-Z" represents "×10$^{-z}$".

A double asterisk suffixed to a surface number in the numerical value embodiment of the wide attachment indicates a curvature radius of a spherical surface (a reference spherical surface) that passes through the lens vertex and the maximum effective diameter of the aspherical surface. The same applies to the following numerical value embodiments.

Numerical Value Embodiment 1

| (Wide Attachment WA) [unit: mm] | | | | | |
|---|---|---|---|---|---|
| Surface data | | | | | |
| Surface number i | ri | di | ndi | vdi | Effective diameter |
| 1 | 150.000 | 4.60 | 1.51633 | 64.1 | 99.44 |
| 2* | 100.000 | 18.90 | | | 91.15 |
| 2** | 99.742 | | | | |

| Aspheric surface data 2nd surface |
|---|
| K = 2.05260e+000 |
| A4 = −1.58766e−007 |
| A6 = −1.87492e−010 |
| A8 = 7.58670e−014 |
| A10 = −2.50293e−017 |

| | |
|---|---|
| Focal length | 8.01 |
| F-number | 1.90 |
| Half angle of view (deg) | 34.49 |

| | |
|---|---|
| Image height | 5.50 |
| Total lens length | 303.95 |

Single lens data

| Lens | Start surface | Focal length |
|---|---|---|
| 1 | 1 | −597.64 |

(Master Lens M1)
[unit: mm]

Surface data

| Surface number i | ri | di | ndi | vdi |
|---|---|---|---|---|
| 1 | −2676.877 | 2.50 | 1.80518 | 25.4 |
| 2 | 206.698 | 7.23 | | |
| 3 | 2182.115 | 2.50 | 1.80100 | 35.0 |
| 4 | 434.752 | 6.38 | 1.43387 | 95.1 |
| 5 | −298.198 | 0.20 | | |
| 6 | 755.007 | 4.11 | 1.43387 | 95.1 |
| 7 | −386.897 | 8.66 | | |
| 8 | −2043.707 | 8.40 | 1.43387 | 95.1 |
| 9 | −105.255 | 2.79 | | |
| 10 | −80.393 | 2.40 | 1.74950 | 35.3 |
| 11 | −137.961 | 0.15 | | |
| 12 | 205.695 | 5.37 | 1.59522 | 67.7 |
| 13 | −689.638 | 0.20 | | |
| 14 | 763.147 | 5.88 | 1.59522 | 67.7 |
| 15 | −166.515 | 0.47 | | |
| 16 | 49.429 | 5.30 | 1.76385 | 48.5 |
| 17 | 80.503 | (variable) | | |
| 18* | 250.617 | 1.07 | 2.00330 | 28.3 |
| 19 | 15.777 | 5.11 | | |
| 20 | −337.514 | 7.20 | 1.80809 | 22.8 |
| 21 | −13.903 | 0.81 | 1.88300 | 40.8 |
| 22 | 47.703 | 0.23 | | |
| 23 | 31.306 | 2.98 | 1.76182 | 26.5 |
| 24 | 517.244 | (variable) | | |
| 25 | −20.456 | 0.75 | 1.75700 | 47.8 |
| 26 | 67.398 | 5.06 | 1.84649 | 23.9 |
| 27 | −77.054 | (variable) | | |
| 28 | −137.948 | 4.19 | 1.64000 | 60.1 |
| 29 | −44.112 | 0.15 | | |
| 30 | 84.287 | 3.39 | 1.51633 | 64.1 |
| 31 | −149.579 | (variable) | | |
| 32 (stop) | ∞ | 0.74 | | |
| 33 | 46.700 | 3.50 | 1.58913 | 61.1 |
| 34 | 106.519 | 2.00 | 1.95375 | 32.3 |
| 35 | 76.620 | 30.67 | | |
| 36 | 32.555 | 4.33 | 1.48749 | 70.2 |
| 37 | −1403.873 | 0.20 | | |
| 38 | 275.626 | 1.00 | 1.88300 | 40.8 |
| 39 | 19.335 | 6.86 | 1.49700 | 81.5 |
| 40 | −216.574 | 0.18 | | |
| 41 | 43.749 | 7.40 | 1.54814 | 45.8 |
| 42 | −22.627 | 1.00 | 1.88300 | 40.8 |
| 43 | 243.930 | 2.12 | | |
| 44 | 49.770 | 7.28 | 1.48749 | 70.2 |
| 45 | −30.568 | 4.50 | | |
| 46 | ∞ | 33.00 | 1.60859 | 46.4 |
| 47 | ∞ | 13.20 | 1.51633 | 64.1 |
| 48 | ∞ | 7.21 | | |
| Image plane | ∞ | | | |

Aspheric surface data
18th surface

K = 1.70731e+002
A4 = 9.28346e−006
A6 = −1.76629e−008
A8 = 5.54259e−011
A10 = −3.10285e−013
A12 = 7.67821e−016

Various data
Zoom ratio 15.92

| | | |
|---|---|---|
| Focal length | 9.00 | 143.25 |
| F-number | 1.90 | 2.51 |
| Half angle of view (deg) | 31.43 | 2.20 |
| Image height | 5.50 | 5.50 |
| Total lens length | 280.33 | 280.33 |
| BF | 7.21 | 7.21 |

As shown in numerical values in Table 1 arranged to correspond to the conditional expressions (1) to (5), the wide attachment of this embodiment satisfies all the conditional expressions. Though small in size and light in weight, the wide attachment of this embodiment provided with the above-described characteristic configuration can achieve an optical performance to sufficiently correct aberrations by itself.

Embodiment 2

Figure 4:
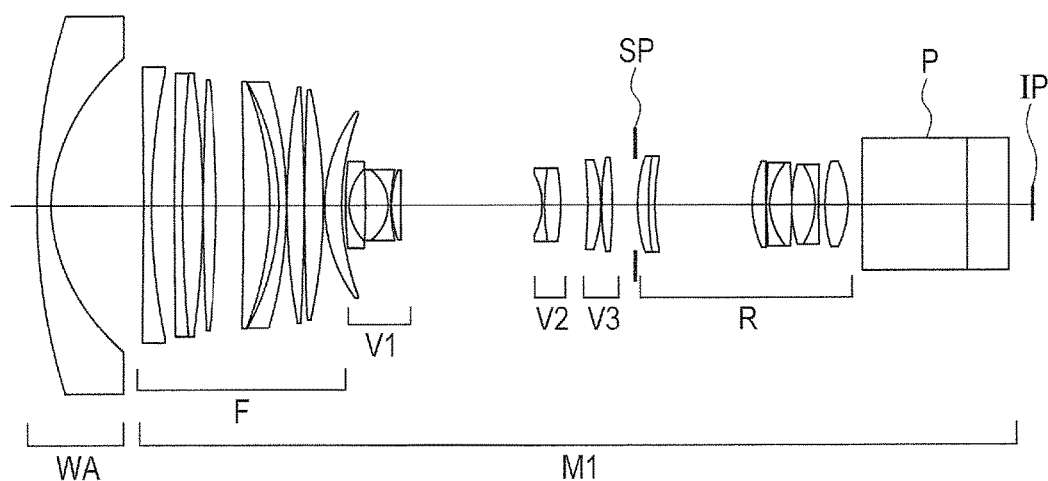
FIG. 4 is a lens sectional view of the master lens M1, which is equipped with a wide attachment of Embodiment 2, set to the wide-angle end, and focused on an object at an indefinite distance.
Figure 5:
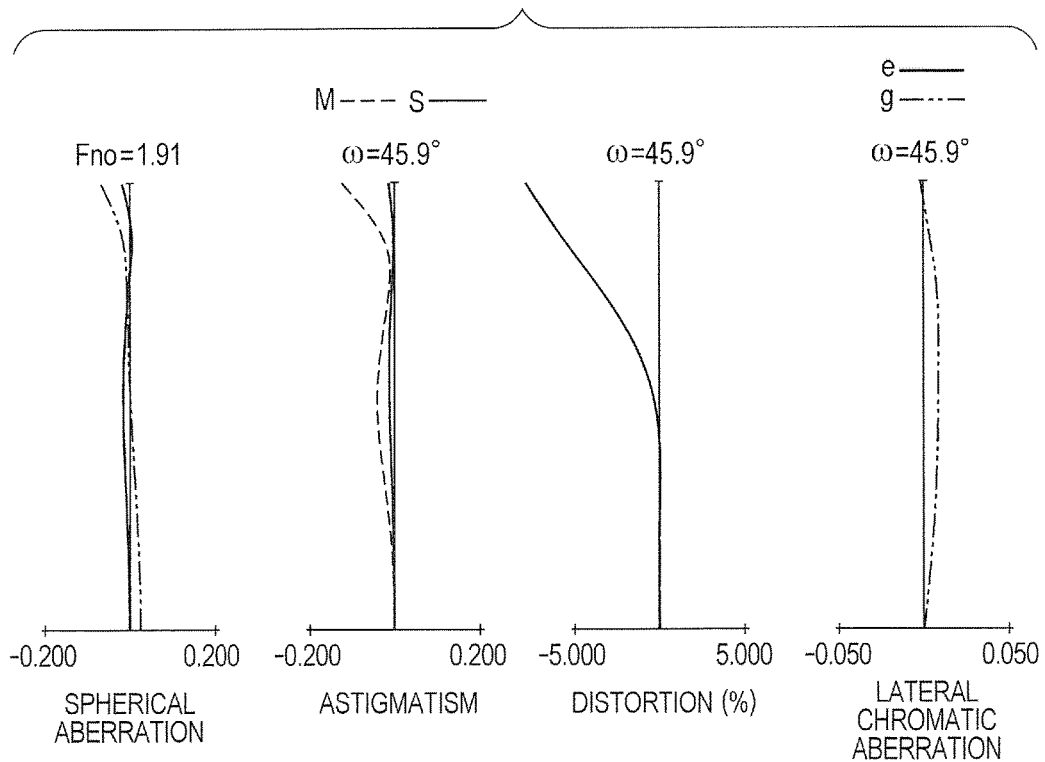
FIG. 5 shows aberration diagrams of the master lens M1, which is equipped with the wide attachment of Embodiment 2, set to the wide-angle end, and focused on an object at an indefinite distance.

FIG. 4 is a lens sectional view showing a state of attaching a wide attachment representing Embodiment 2 of the present invention to the object side of the above-described master lens M1, which is set to a wide-angle end and focused on an object at an indefinite distance. FIG. 5 shows aberration diagrams in this state. The wide attachment WA of this embodiment is formed of a single meniscus lens having a negative refractive power, and its 2nd surface being a surface on the image side has an aspherical surface.

A numerical value embodiment of the wide attachment WA of Embodiment 2 is shown below. Note that the numerical value embodiment concerning the master lens M1 is the same as that in Embodiment 1 and is therefore omitted.

Numerical Value Embodiment 2

(Wide Attachment WA)
[unit: mm]

Surface data

| Surface number i | ri | di | ndi | vdi | Effective diameter |
|---|---|---|---|---|---|
| 1 | 200.000 | 4.60 | 1.51633 | 64.1 | 116.01 |
| 2* | 50.000 | 29.04 | | | 89.75 |
| 2** | 57.982 | | | | |

Aspheric surface data
2nd surface

K = −3.62314e−001
A4 = −4.99502e−007
A6 = −3.53967e−010
A8 = 2.85556e−013
A10 = −6.77200e−017

| | |
|---|---|
| Focal length | 5.33 |
| F-number | 1.91 |
| Half angle of view (deg) | 45.90 |
| Image height | 5.50 |
| Total lens length | 314.34 |

Single lens data

| Lens | Start surface | Focal length |
|---|---|---|
| 1 | 1 | −130.00 |

As shown in numerical values in Table 1 arranged to correspond to the conditional expressions (1) to (5), the wide attachment of this embodiment satisfies all the conditional expressions. Though small in size and light in weight, the wide attachment of this embodiment provided with the above-described characteristic configuration can achieve an optical performance to sufficiently correct aberrations by itself.

Embodiment 3

Figure 6:
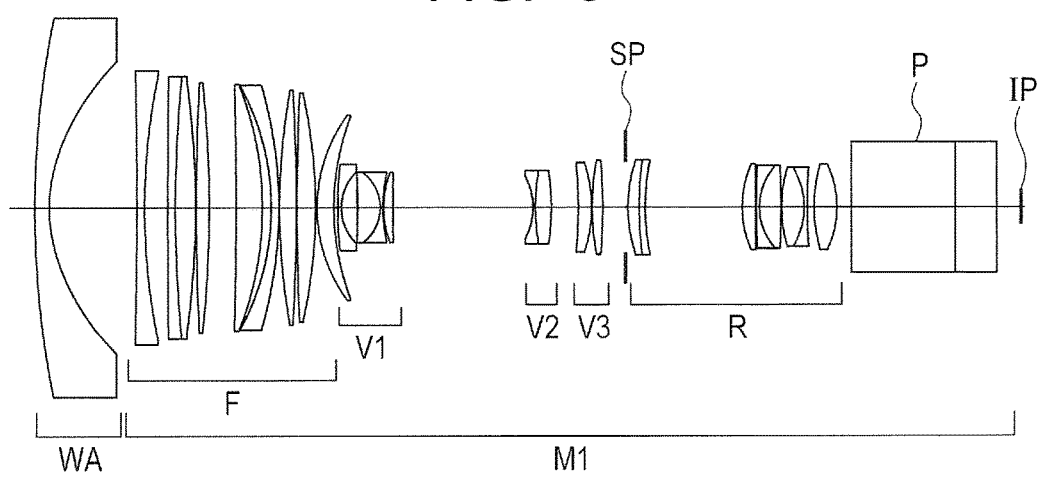
FIG. 6 is a lens sectional view of the master lens M1, which is equipped with a wide attachment of Embodiment 3, set to the wide-angle end, and focused on an object at an indefinite distance.
Figure 7:
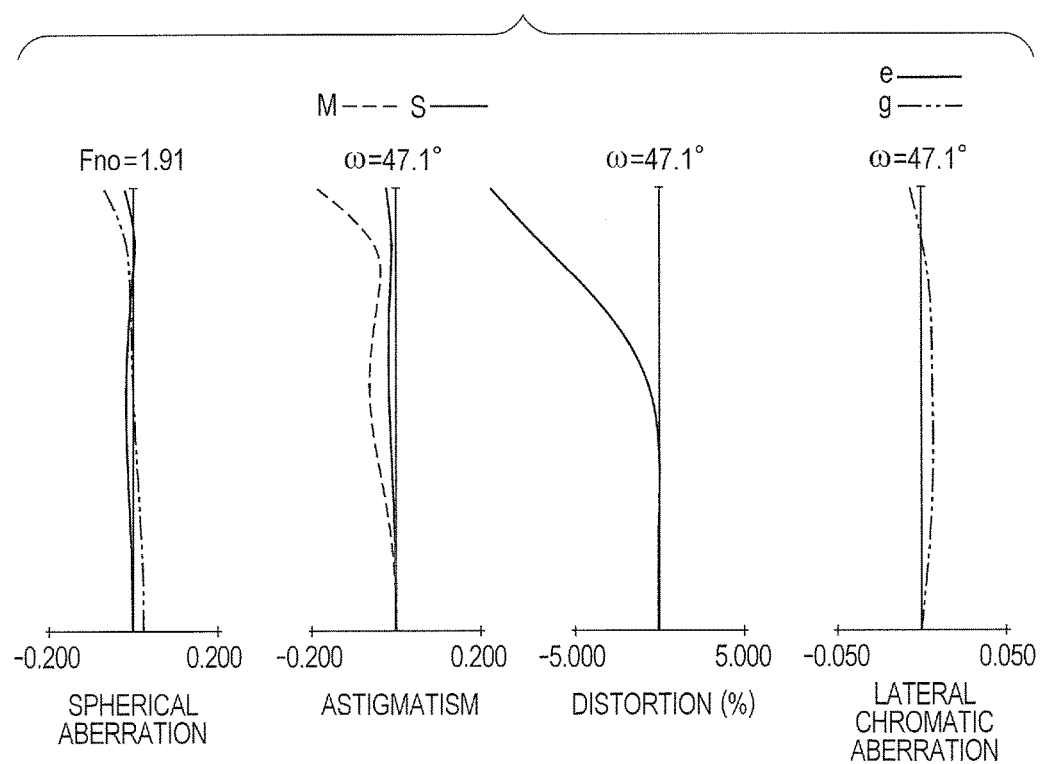
FIG. 7 shows aberration diagrams of the master lens M1, which is equipped with the wide attachment of Embodiment 3, set to the wide-angle end, and focused on an object at an indefinite distance.

FIG. 6 is a lens sectional view showing a state of attaching a wide attachment representing Embodiment 3 of the present invention to the object side of the above-described master lens M1 which is set to a wide-angle end. FIG. 7 shows aberration diagrams in this state. The wide attachment of this embodiment is formed of a single meniscus lens having a negative refractive power, and its second surface being a surface on the image side has an aspherical surface.

Numerical data on the wide attachment WA of Embodiment 3 are shown below.

Numerical Value Embodiment 3

| (Wide Attachment WA) [unit: mm] | | | | | |
|---|---|---|---|---|---|
| Surface data | | | | | |
| Surface number i | ri | di | ndi | vdi | Effective diameter |
| 1 | 300.000 | 4.60 | 1.51633 | 64.1 | 117.01 |
| 2* | 50.000 | 27.71 | | | 89.73 |
| 2** | 60.640 | | | | |
| Aspheric surface data 2nd surface | | | | | |
| K = −6.94878e−001 A4 = −4.19416e−007 A6 = −3.70917e−010 A8 = 3.37695e−013 A10 = −7.27286e−017 | | | | | |
| Focal length | | 5.11 | | | |
| F-number | | 1.91 | | | |
| Half angle of view (deg) | | 47.09 | | | |
| Image height | | 5.50 | | | |
| Total lens length | | 313.04 | | | |
| Single lens data | | | | | |
| Lens | Start surface | | Focal length | | |
| 1 | 1 | | −116.51 | | |

As shown in numerical values in Table 1 arranged to correspond to the conditional expressions (1) to (5), the wide attachment of this embodiment satisfies all the conditional expressions. Though small in size and light in weight, the wide attachment of this embodiment provided with the above-described characteristic configuration can achieve an optical performance to sufficiently correct aberrations by itself.

Embodiment 4

Figure 8:
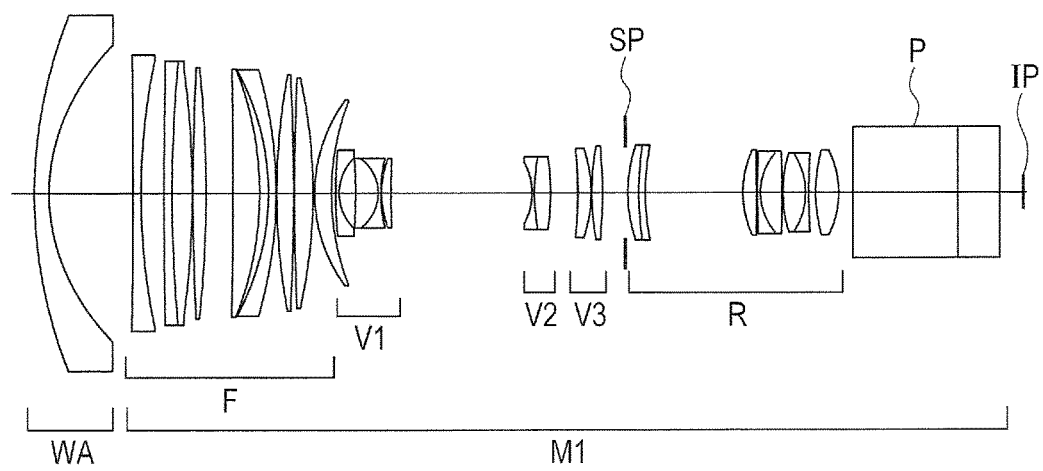
FIG. 8 is a lens sectional view of the master lens M1, which is equipped with a wide attachment of Embodiment 4, set to the wide-angle end, and focused on an object at an indefinite distance.
Figure 9:
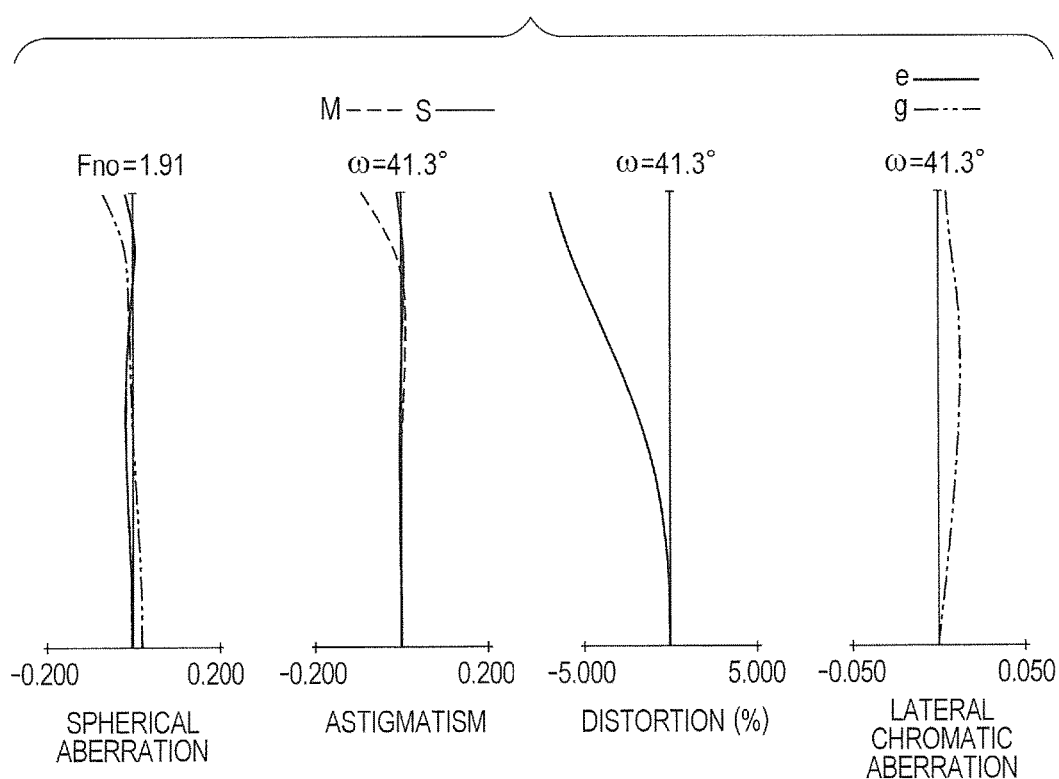
FIG. 9 shows aberration diagrams of the master lens M1, which is equipped with the wide attachment of Embodiment 4, set to the wide-angle end, and focused on an object at an indefinite distance.

FIG. 8 is a lens sectional view showing a state of attaching a wide attachment WA representing Embodiment 4 of the present invention to the object side of the above-described master lens M1 which is set to a wide-angle end. FIG. 9 shows aberration diagrams in this state. The wide attachment WA of this embodiment is formed of a single meniscus lens having a negative refractive power, and its second surface being a surface on the image side has an aspherical surface.

Numerical data on the wide attachment WA of Embodiment 4 are shown below.

Numerical Value Embodiment 4

| (Wide Attachment WA) [unit: mm] | | | | | |
|---|---|---|---|---|---|
| Surface data | | | | | |
| Surface number i | ri | di | ndi | vdi | Effective diameter |
| 1 | 150.000 | 4.60 | 1.51633 | 64.1 | 108.72 |
| 2* | 60.000 | 26.39 | | | 90.11 |
| 2** | 63.849 | | | | |
| Aspheric surface data 2nd surface | | | | | |
| K = −7.50192e−001 A4 = 4.93243e−008 A6 = 1.20498e−010 A8 = −2.35722e−015 A10 = −3.51264e−018 | | | | | |
| Focal length | | 6.26 | | | |
| F-number | | 1.91 | | | |
| Half angle of view (deg) | | 41.29 | | | |
| Image height | | 5.50 | | | |
| Total lens length | | 311.61 | | | |
| Single lens data | | | | | |
| Lens | Start surface | | Focal length | | |
| 1 | 1 | | −196.38 | | |

As shown in numerical values in Table 1 arranged to correspond to the conditional expressions (1) to (5), the wide attachment of this embodiment satisfies all the conditional expressions. Though small in size and light in weight, the wide attachment of this embodiment provided with the above-described characteristic configuration can achieve an optical performance to sufficiently correct aberrations by itself.

Embodiment 5

A description will be given of a wide attachment according to Embodiment 5 of the present invention and a prime lens being a master lens M2 equipped with the wide attachment.

Figure 10:
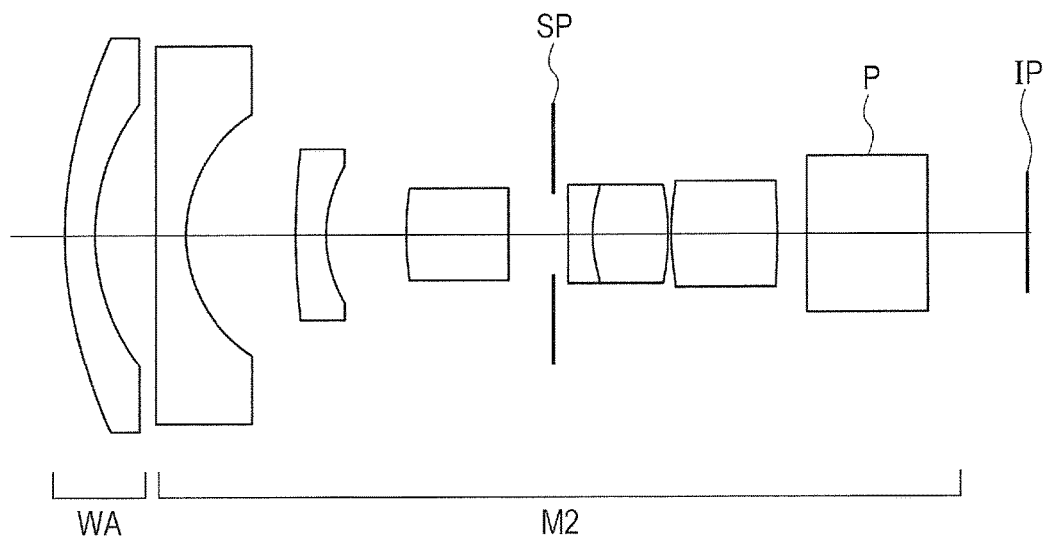
FIG. 10 is a lens sectional view of a master lens M2 (a prime lens), which is equipped with a wide attachment of Embodiment 5 and focused on an object at an indefinite distance.
Figure 11:
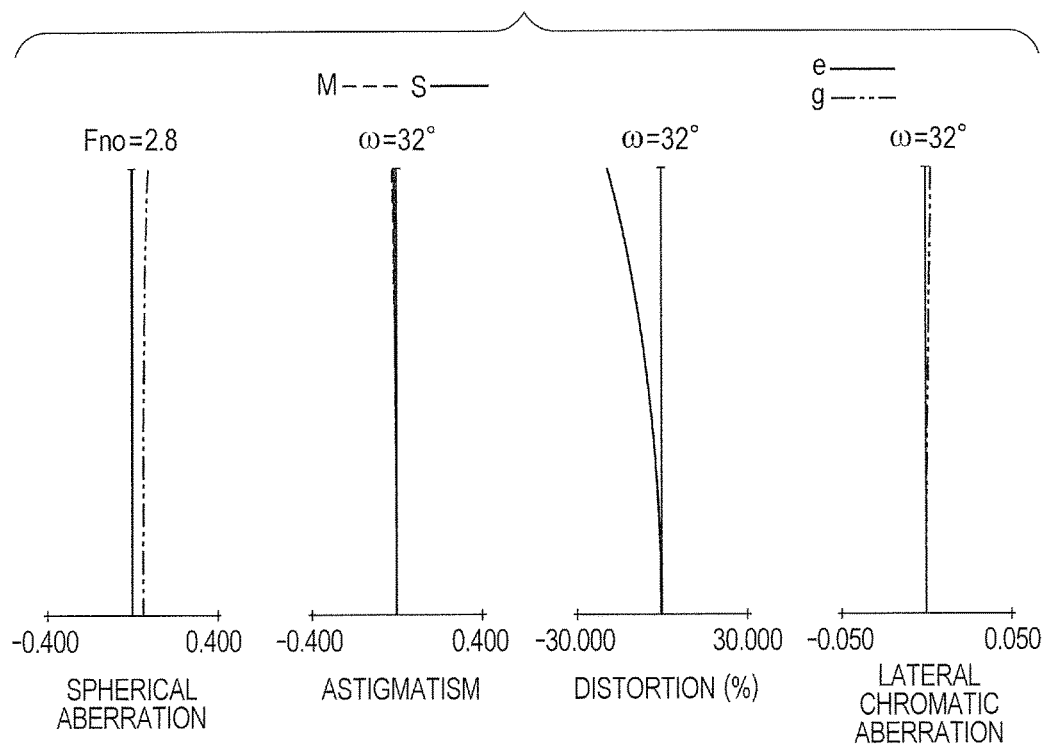
FIG. 11 shows aberration diagrams of the master lens M2 focused on an object at an indefinite distance.
Figure 12:
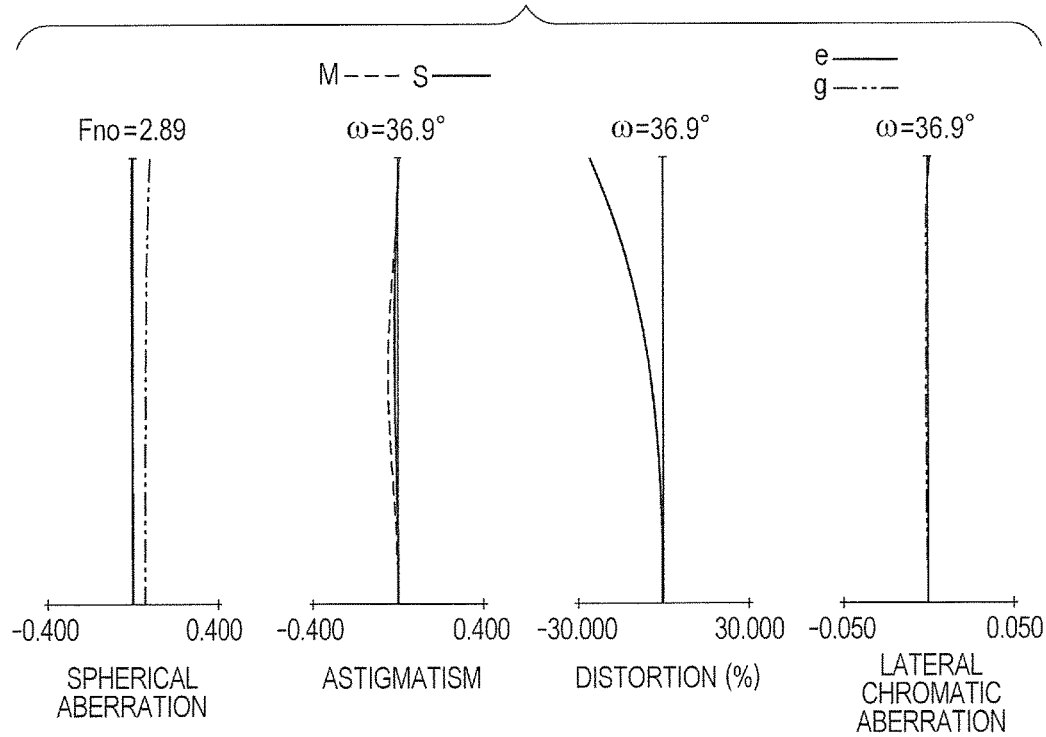
FIG. 12 shows aberration diagrams of the master lens M2, which is equipped with the wide attachment of Embodiment 5 and focused on an object at an indefinite distance.

FIG. 10 is a lens sectional view showing a state of attaching the wide attachment representing Embodiment 5 of the present invention to the object side of the above-described master lens M2. FIG. 11 shows aberration diagrams of the master lens M2, and FIG. 12 shows aberration diagrams of the master lens M2 with the wide attachment of this embodiment attached to the object side.

The prime lens serving as the master lens M2 equipped with the wide attachment of this embodiment includes a negative lens, another negative lens, a positive lens, a stop SP, a cemented lens formed of a negative lens and a positive lens, another positive lens, and a unit P being either a color-separating prism or an optical filter, which are arranged in this order from the object side to the image side. The unit P is illustrated as a glass block in FIG. 10. The master lens M2 is the prime lens with a focal length of 3.2 mm and a field of view of 64.00 degrees.

The wide attachment WA of this embodiment is formed of a single meniscus lens having a negative refractive power, and its 1st surface being a surface on the object side has an aspherical surface.

Numerical value data on the wide attachment WA of Embodiment 5 are shown below.

Numerical Value Embodiment 5

(Wide Attachment WA)
[unit: mm]

Surface data

| Surface number i | ri | di | ndi | vdi | Effective diameter |
|---|---|---|---|---|---|
| 1* | 14.060 | 1.00 | 1.52540 | 56.3 | 12.00 |
| 2 | 7.102 | 2.00 | | | 8.00 |
| 1** | 14.560 | | | | |

Aspheric surface data
1st surface

K = 2.91732e+000
A4 = 1.12715e−004
A6 = −1.43521e−005
A8 = 1.07336e−007
A10 = −5.06432e−010

| Focal length | 2.66 |
|---|---|
| F-number | 2.89 |
| Half angle of view (deg) | 36.89 |
| Image height | 2.00 |
| Total lens length | 31.84 |

Single lens data

| Lens | Start surface | Focal length |
|---|---|---|
| 1 | 1 | −28.62 |

(Master Lens M2)
[unit: mm]

Surface data

| Surface number i | ri | di | ndi | vdi |
|---|---|---|---|---|
| 1 | ∞ | 1.00 | 1.49700 | 81.6 |
| 2 | 4.700 | 3.64 | | |
| 3 | 25.000 | 1.00 | 1.49700 | 81.6 |
| 4 | 4.400 | 2.65 | | |
| 5 | 10.760 | 3.40 | 1.92286 | 20.9 |
| 6 | −220.000 | 1.47 | | |
| 7 (stop) | ∞ | 0.50 | | |
| 8 | −48.000 | 0.80 | 1.92286 | 20.9 |
| 9 | 5.040 | 2.50 | 1.72916 | 54.7 |
| 10 | −7.620 | 0.10 | | |
| 11 | 9.550 | 3.50 | 1.72916 | 54.7 |
| 12 | −28.660 | 1.00 | | |
| 13 | ∞ | 4.00 | 1.51680 | 64.2 |
| 14 | ∞ | 2.99 | | |
| Image plane | ∞ | | | |

| Focal length | 3.20 |
|---|---|
| F-number | 2.80 |
| Half angle of view (deg) | 32.00 |
| Image height | 2.00 |
| Total lens length | 28.54 |
| BF | 2.99 |

As shown in numerical values in Table 1 arranged to correspond to the conditional expressions (1) to (5), the wide attachment of this embodiment satisfies all the conditional expressions. Though small in size and light in weight, the wide attachment of this embodiment provided with the above-described characteristic configuration can achieve an optical performance to sufficiently correct aberrations by itself.

Embodiment 6

A description will be given of a wide attachment according to Embodiment 6 of the present invention and a prime lens being a master lens M3 equipped with the wide attachment.

Figure 13:
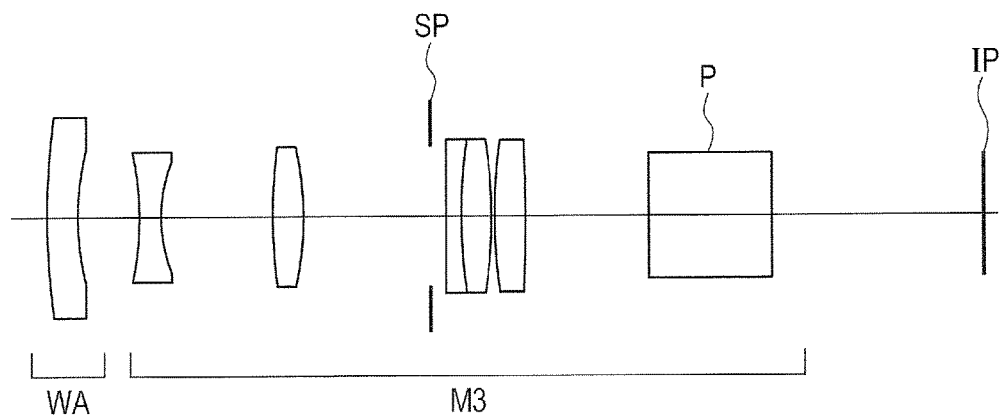
FIG. 13 is a lens sectional view of a master lens M3 (a prime lens), which is equipped with a wide attachment of Embodiment 6 and focused on an object at an indefinite distance.
Figure 14:
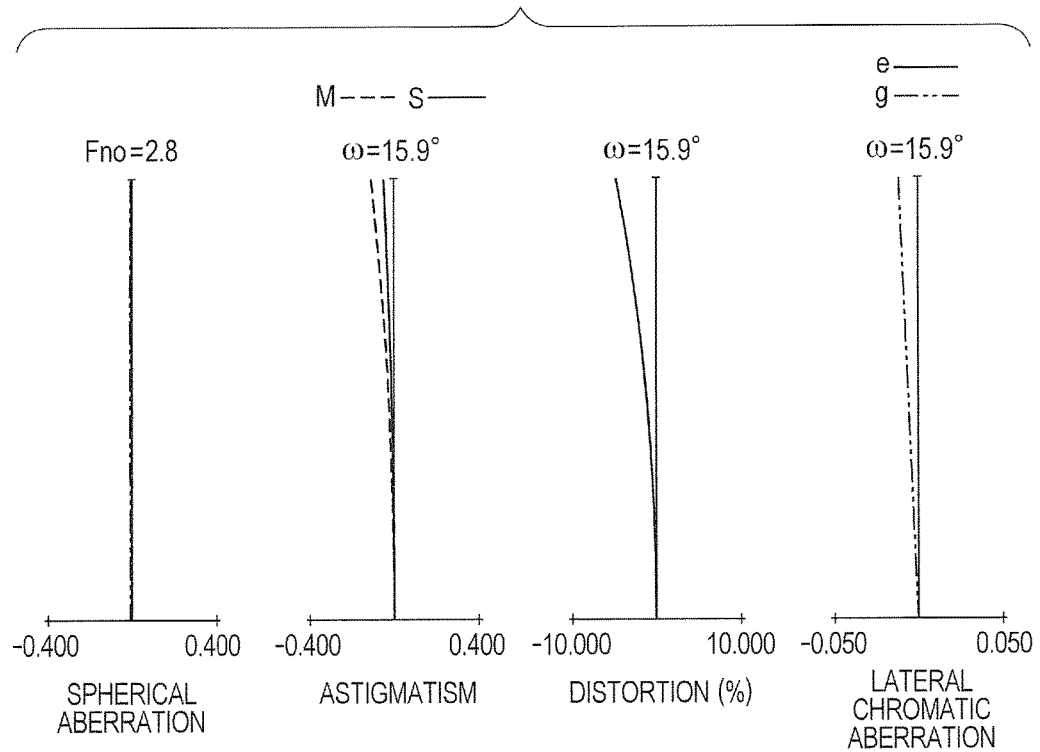
FIG. 14 shows aberration diagrams of the master lens M3 focused on an object at an indefinite distance.
Figure 15:
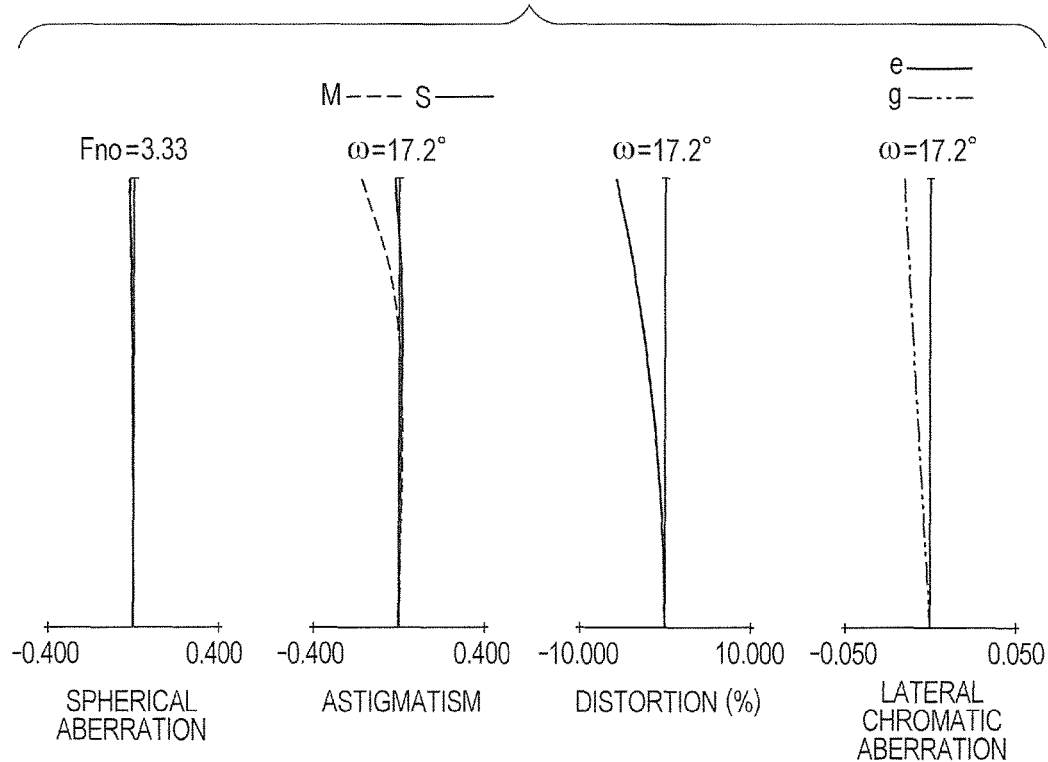
FIG. 15 shows aberration diagrams of the master lens M3, which is equipped with the wide attachment of Embodiment 6 and focused on an object at an indefinite distance.

FIG. 13 is a lens sectional view showing a state of attaching the wide attachment representing Embodiment 6 of the present invention to the object side of the above-described master lens M3. FIG. 14 shows aberration diagrams of the master lens M3, and FIG. 15 shows aberration diagrams of the master lens M3 with the wide attachment of this embodiment attached to the object side.

The prime lens serving as the master lens M3 equipped with the wide attachment of this embodiment includes a negative lens, a positive lens, a stop SP, a cemented lens formed of a meniscus negative lens with a convex surface on the image side and a positive lens, another positive lens, and a unit P being either a color-separating prism or an optical filter, which are arranged in this order from the object side to the image side. The unit P is illustrated as a glass block in FIG. 13. The master lens M3 is the prime lens with a focal length of 7.0 mm and a field of view of 31.90 degrees.

The wide attachment WA of this embodiment is formed of a single meniscus lens having a negative refractive power, and its 1st surface being a surface on the object side has an aspherical surface.

Numerical value data on the wide attachment WA of Embodiment 6 are shown below.

Numerical Value Embodiment 6

(Wide Attachment WA)
[unit: mm]

Surface data

| Surface number i | ri | di | ndi | vdi | Effective diameter |
|---|---|---|---|---|---|
| 1* | 21.625 | 1.00 | 1.52540 | 56.3 | 6.00 |
| 2 | 8.941 | 2.00 | | | 4.00 |
| 1** | 23.297 | | | | |

Aspheric surface data
1st surface

K = 1.35060e+000
A4 = −3.68699e−004
A6 = 2.51229e−005
A8 = −7.56722e−007
A10 = −3.31216e−010

| Focal length | 6.46 |
|---|---|
| F-number | 3.33 |

-continued

| | | |
|---|---|---|
| Half angle of view (deg) | 17.21 | |
| Image height | 2.00 | |
| Total lens length | 30.47 | |

Single lens data

| Lens | Start surface | Focal length |
|---|---|---|
| 1 | 1 | −29.70 |

(Master Lens M3)
[unit: mm]

Surface data

| Surface number i | ri | di | ndi | vdi |
|---|---|---|---|---|
| 1 | −10.000 | 0.70 | 1.49700 | 81.6 |
| 2 | 4.986 | 3.64 | | |
| 3 | 17.143 | 1.00 | 1.49700 | 81.6 |
| 4 | −10.027 | 4.12 | | |
| 5 (stop) | ∞ | 0.50 | | |
| 6 | 2411.199 | 0.50 | 1.92286 | 20.9 |
| 7 | 17.070 | 1.00 | 1.72916 | 54.7 |
| 8 | −14.486 | 0.10 | | |
| 9 | 17.395 | 1.00 | 1.72916 | 54.7 |
| 10 | −58.599 | 4.00 | | |
| 11 | ∞ | 4.00 | 1.51680 | 64.2 |
| 12 | ∞ | 5.39 | | |
| Image plane | ∞ | | | |

| | |
|---|---|
| Focal length | 7.00 |
| F-number | 2.80 |
| Half angle of view (deg) | 15.95 |
| Image height | 2.00 |
| Total lens length | 25.94 |
| BF | 5.39 |

As shown in numerical values in Table 1 arranged to correspond to the conditional expressions (1) to (5), the wide attachment of this embodiment satisfies all the conditional expressions. Though small in size and light in weight, the wide attachment of this embodiment provided with the above-described characteristic configuration can achieve an optical performance to sufficiently correct aberrations by itself.

Embodiment 7

Figure 16:
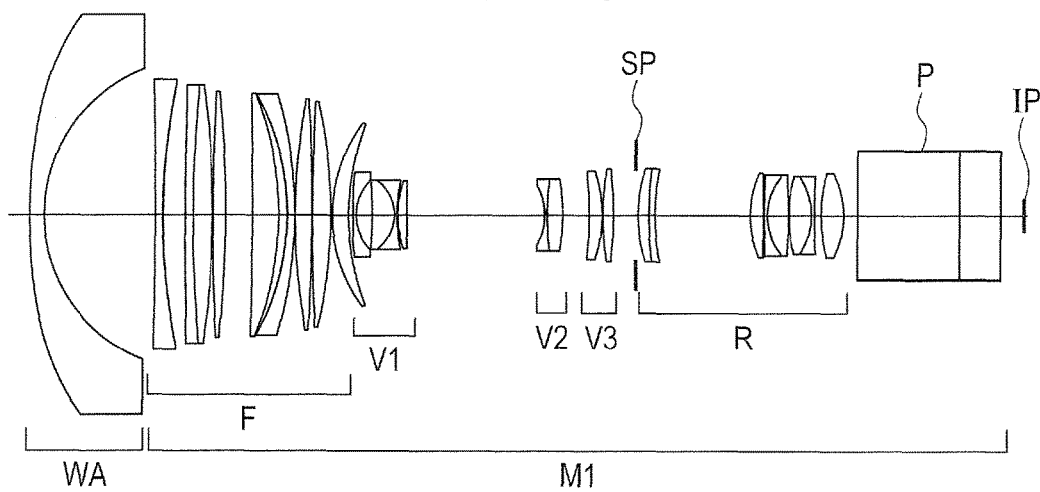
FIG. 16 is a lens sectional view of the master lens M1, which is equipped with a wide attachment of Embodiment 7 and focused on an object at an indefinite distance.
Figure 17:
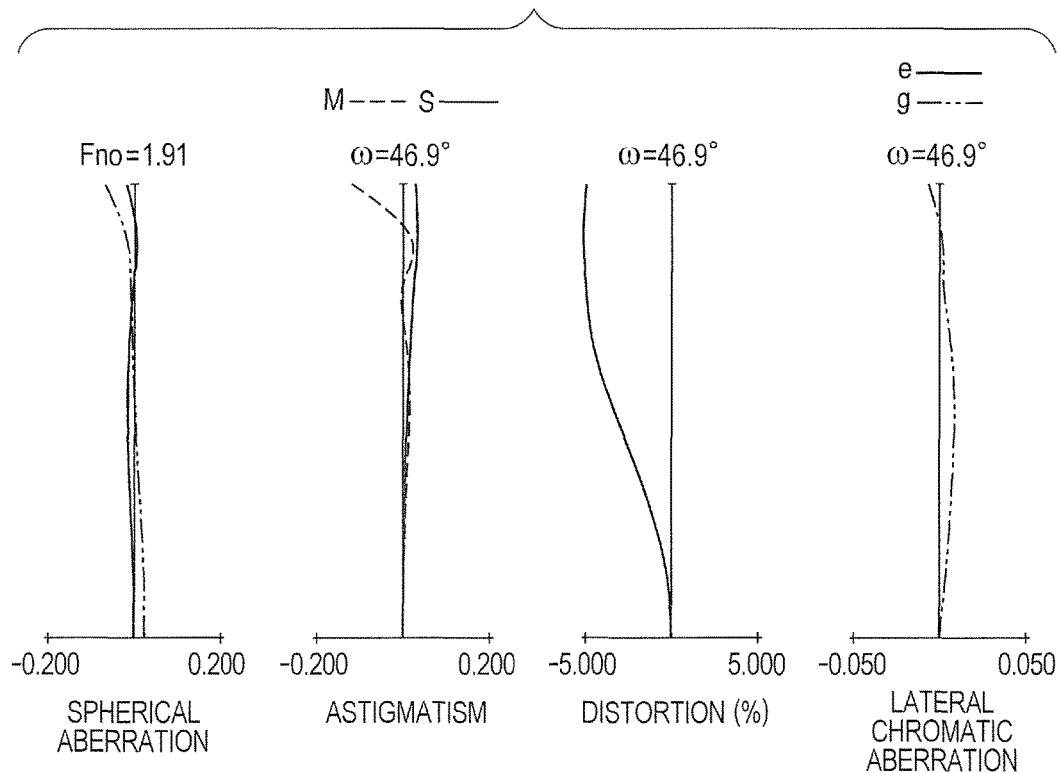
FIG. 17 shows aberration diagrams of the master lens M1, which is equipped with the wide attachment of Embodiment 7 and focused on an object at an indefinite distance.

FIG. 16 is a lens sectional view showing a state of attaching a wide attachment WA representing Embodiment 7 of the present invention to the object side of the above-described master lens M1 which is set to the wide-angle end. FIG. 17 shows aberration diagrams in this state. The wide attachment of this embodiment is formed of a single meniscus lens having a negative refractive power, and its 1st surface being the surface on the object side has an aspherical surface.

Numerical value data on the wide attachment WA of Embodiment 7 are shown below.

Numerical Value Embodiment 7

(Wide Attachment WA)
[unit: mm]

Surface data

| Surface number i | ri | di | ndi | vdi | Effective diameter |
|---|---|---|---|---|---|
| 1* | 200.000 | 4.60 | 1.51633 | 64.1 | 124.53 |
| 2 | 50.000 | 36.54 | | | 90.20 |
| 1** | 135.156 | | | | |

Aspheric surface data
1st surface

K = 7.18549e+000
A4 = 2.56862e−007
A6 = −6.65098e−011
A8 = 2.26904e−014
A10 = −3.70076e−018

| | |
|---|---|
| Focal length | 5.15 |
| F-number | 1.91 |
| Half angle of view (deg) | 46.86 |
| Image height | 5.50 |
| Total lens length | 321.83 |

Single lens data

| Lens | Start surface | Focal length |
|---|---|---|
| 1 | 1 | −130.00 |

As shown in numerical values in Table 1 arranged to correspond to the conditional expressions (1) to (5), the wide attachment of this embodiment satisfies all the conditional expressions. Though small in size and light in weight, the wide attachment of this embodiment provided with the above-described characteristic configuration can achieve an optical performance to sufficiently correct aberrations by itself.

Embodiment 8

Figure 18:
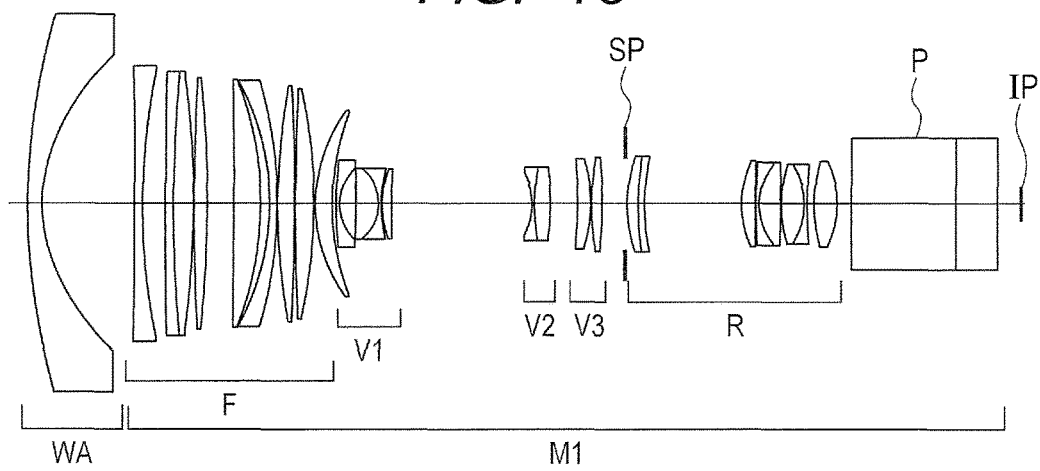
FIG. 18 is a lens sectional view of the master lens M1, which is equipped with a wide attachment of Embodiment 8 and focused on an object at an indefinite distance.
Figure 19:
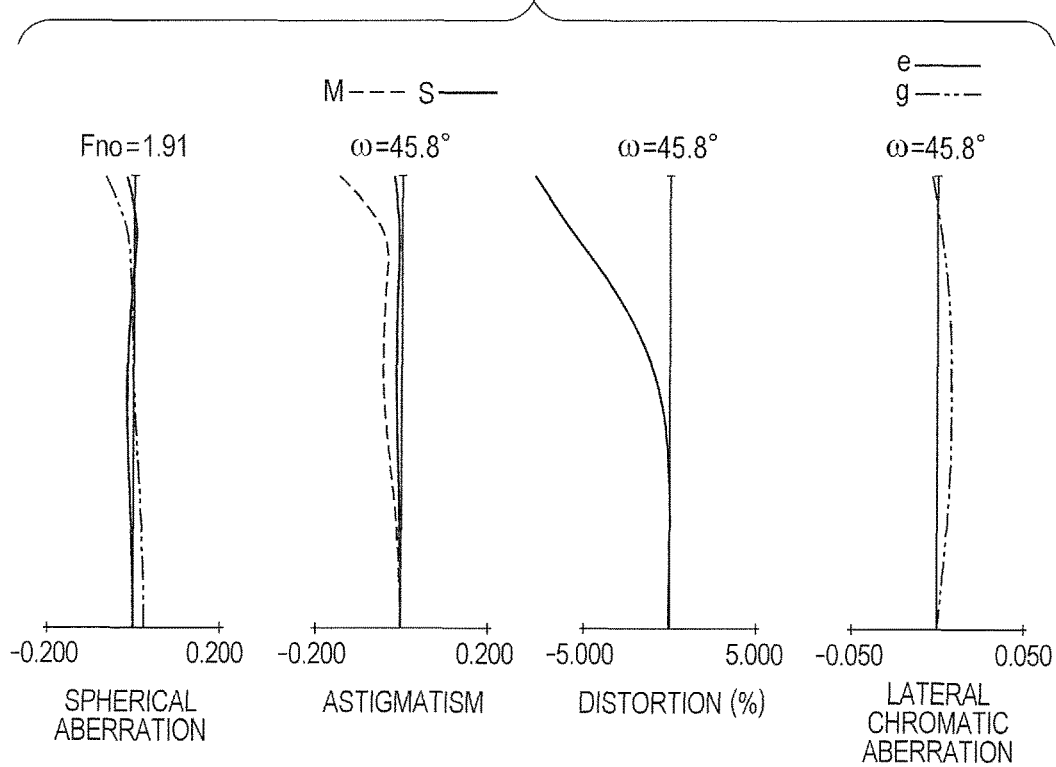
FIG. 19 shows aberration diagrams of the master lens M1, which is equipped with the wide attachment of Embodiment 8 and focused on an object at an indefinite distance.

FIG. 18 is a lens sectional view showing a state of attaching a wide attachment WA representing Embodiment 8 of the present invention to the object side of the above-described master lens M1 which is set to the wide-angle end. FIG. 19 shows aberration diagrams in this state. The wide attachment WA of this embodiment is formed of a single meniscus lens having a negative refractive power, and both of its surfaces on the object side and the image side have an aspherical surface.

Numerical value data on the wide attachment WA of Embodiment 8 are shown below.

Numerical Value Embodiment 8

(Wide Attachment WA)
[unit: mm]

Surface data

| Surface number i | ri | di | ndi | vdi | Effective diameter |
|---|---|---|---|---|---|
| 1* | 200.000 | 4.60 | 1.51633 | 64.1 | 115.48 |
| 2* | 50.000 | 28.55 | | | 89.74 |

-continued (Wide Attachment WA)
[unit: mm]

| 1** | 209.4988 |
| 2** | 58.8291 |

Aspheric surface data

1st surface

K = 6.52749e+000
A4 = −2.39682e−008
A6 = −9.95310e−011
A8 = 2.09272e−014
A10 = −2.10708e−018

2nd surface

K = −3.06469e−001
A4 = −5.26739e−007
A6 = −2.21018e−010
A8 = 5.11199e−014
A10 = −9.38383e−018

| Focal length | 5.34 |
| F-number | 1.91 |
| Half angle of view (deg) | 45.84 |
| Image height | 5.50 |
| Total lens length | 313.85 |

Single lens data

| Lens | Start surface | Focal length |
|---|---|---|
| 1 | 1 | −130.00 |

As shown in numerical values in Table 1 arranged to correspond to the conditional expressions (1) to (5), the wide attachment of this embodiment satisfies all the conditional expressions. Though small in size and light in weight, the wide attachment of this embodiment provided with the above-described characteristic configuration can achieve an optical performance to sufficiently correct aberrations by itself.

TABLE 1

| Conditional Expression | | Embodiment | | | | | | | |
|---|---|---|---|---|---|---|---|---|---|
| | | 1 | 2 | 3 | 4 | 5 | 6 | 7 | 8 |
| (1) | r1 | 150.00 | 200.00 | 300.00 | 150.00 | 14.56 | 23.30 | 135.16 | 209.50 |
| | r2 | 99.74 | 57.98 | 60.40 | 63.85 | 7.10 | 8.90 | 50.00 | 58.83 |
| | −(r1 + r2)/(r1 − r2) | −4.97 | −1.82 | −1.50 | −2.48 | −2.90 | −2.24 | −2.17 | −2.17 |
| | fa | −597.64 | −130.00 | −116.51 | −196.38 | −28.62 | −29.70 | −130.00 | −130.00 |
| | fmw | 9 | 9 | 9 | 9 | 3.2 | 7 | 9 | 9 |
| (2) | fmw/fa | −0.015 | −0.069 | −0.077 | −0.046 | −0.112 | −0.236 | −0.069 | −0.069 |
| | aspherical surface | r2 | r2 | r2 | r2 | r1 | r1 | r1 | r1  r2 |
| (3) | |Δ4/Δ7| | 0.18 | 0.53 | 0.55 | 0.51 | 0.31 | 0.73 | 0.51 | 0.48  0.49 |
| (4) | |Δ9/Δ7| | 1.18 | 0.68 | 0.64 | 0.74 | 0.62 | 0.47 | 0.65 | 0.43  0.67 |
| (5) | nd | 1.51633 | 1.51633 | 1.51633 | 1.51633 | 1.52540 | 1.52540 | 1.51633 | 1.51633 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-133469, filed Jul. 5, 2016, which is hereby incorporated by reference herein in its entirety.

What is claimed is:

1. A wide attachment which is detachably attachable to an object side of a lens apparatus, the attachment consisting of:

a meniscus lens having a negative refractive power, wherein the meniscus lens has an aspherical surface, and conditional expressions $$-5.2 < -(r1+r2)/(r1-r2) < -1.3;$$

$$1.50 < nd < 1.53;$$

$$0.10 < |\Delta 4/\Delta 7| < 0.80; \text{ and}$$

$$0.20 < |\Delta 9/\Delta 7| < 1.60,$$

are satisfied, where r1 represents a curvature radius of a surface on an object side of the meniscus lens, r2 represents a curvature radius of a surface on an image side of the meniscus lens, and nd represents a refractive index of a material constituting the meniscus lens with respect to d-line, wherein a curvature radius of the aspherical surface is defined as a curvature radius of a reference spherical surface passing through a vertex of the aspherical surface and an end of a maximum effective diameter of the aspherical surface, Δ4, Δ7, and Δ9 respectively represent aspherical surface amounts of the aspherical surface at forty-percent, seventy-percent, and ninety-percent of an effective radius of the meniscus lens, each of the aspherical surface amounts being defined as a length in an optical axis direction between the aspherical surface and the reference spherical surface.

2. The wide attachment according to claim 1, wherein the aspherical surface has an aspherical surface shape to reduce the negative refractive power gradually toward a peripheral part of the aspherical surface.

3. An image pickup lens comprising:

a wide attachment; and a lens apparatus to which the wide attachment is detachably attached on an object side of the lens apparatus, wherein the wide attachment is detachably attachable to the object side of the lens apparatus, the attachment consisting of:

a meniscus lens having a negative refractive power, wherein the meniscus lens has an aspherical surface, and conditional expressions $$-5.2 < -(r1+r2)/(r1-r2) < -1.3;$$

$$1.50 < nd < 1.53;$$

$$0.10 < |\Delta 4/\Delta 7| < 0.80; \text{ and}$$

$$0.20 < |\Delta 9/\Delta 7| < 1.60,$$

are satisfied, where r1 represents a curvature radius of a surface on an object side of the meniscus lens, r2 represents a curvature radius of a surface on an image side of the meniscus lens, and nd represents a refractive index of a material constituting the meniscus lens with respect to d-line, wherein a curvature radius of the aspherical surface is defined as a curvature radius of a reference spherical surface passing through a vertex of the aspherical surface and an end of a maximum effective diameter of the aspherical surface, Δ4, Δ7, and Δ9 respectively represent aspherical surface amounts of the aspherical surface at forty-percent, seventy-percent, and ninety-percent of an effective radius of the meniscus lens, each of the aspherical surface amounts being defined as a length in an optical axis direction between the aspherical surface and the reference spherical surface.

4. The image pickup lens according to claim 3, wherein a conditional expression $$-0.300 < fmw/fa < -0.010$$

is satisfied where fmw represents a focal length of the lens apparatus and fa represents a focal length of the wide attachment.

5. An image pickup apparatus comprising:
an image pickup lens; and
an image pickup element configured to receive an optical image formed with the image pickup lens,
wherein the image pickup lens comprising:
a wide attachment and
a lens apparatus to which the wide attachment is detachably attached on an object side of the lens apparatus,
wherein the wide attachment is detachably attachable to the object side of the lens apparatus, the attachment consisting of:
a meniscus lens having a negative refractive power, wherein
the meniscus lens has an aspherical surface, and conditional expressions $$-5.2 < -(r1+r2)/(r1-r2) < -1.3;$$

$$1.50 < nd < 1.53$$

$$0.10 < |\Delta4/\Delta7| < 0.80; \text{ and}$$

$$0.20 < |\Delta9/\Delta7| < 1.60,$$

are satisfied, where r1 represents a curvature radius of a surface on an object side of the meniscus lens, r2 represents a curvature radius of a surface on an image side of the meniscus lens, and nd represents a refractive index of a material constituting the meniscus lens with respect to d-line, wherein a curvature radius of the aspherical surface is defined as a curvature radius of a reference spherical surface passing through a vertex of the aspherical surface and an end of a maximum effective diameter of the aspherical surface, Δ4, Δ7, and Δ9 respectively represent aspherical surface amounts of the aspherical surface at forty-percent, seventy-percent, and ninety-percent of an effective radius of the meniscus lens, each of the aspherical surface amounts being defined as a length in an optical axis direction between the aspherical surface and the reference spherical surface.

\* \* \* \* \*